US012590264B2

(12) United States Patent
Amorelli et al.

(10) Patent No.: US 12,590,264 B2
(45) Date of Patent: Mar. 31, 2026

(54) PROFRAGRANCE CONJUGATES

(71) Applicant: INTERNATIONAL FLAVORS & FRAGRANCES INC., New York, NY (US)

(72) Inventors: Benjamin Amorelli, Brielle, NJ (US); Daniela De Lucia, Matawan, NJ (US); Evan Sanders Beach, Fanwood, NJ (US)

(73) Assignee: International Flavors & Fragrances Inc., New York, NY (US)

( * ) Notice: Subject to any disclaimer, the term of this patent is extended or adjusted under 35 U.S.C. 154(b) by 566 days.

(21) Appl. No.: 17/928,815

(22) PCT Filed: Jun. 3, 2021

(86) PCT No.: PCT/US2021/035646
§ 371 (c)(1),
(2) Date: Nov. 30, 2022

(87) PCT Pub. No.: WO2021/247824
PCT Pub. Date: Dec. 9, 2021

(65) Prior Publication Data

US 2023/0227750 A1 Jul. 20, 2023

Related U.S. Application Data

(60) Provisional application No. 63/034,148, filed on Jun. 3, 2020.

(51) Int. Cl.
*C11B 9/00* (2006.01)
*A61Q 9/00* (2006.01)

(52) U.S. Cl.
CPC ............. *C11B 9/0011* (2013.01); *C11B 9/008* (2013.01)

(58) Field of Classification Search
CPC ....... C11B 9/0011; C11B 9/008; C11D 3/001; C11D 3/507; A61Q 19/00; C07C 323/22; C07C 323/52; C07C 319/18; C07C 2601/08; A61K 8/46; A61K 8/498; A61K 2800/10; A61K 2800/57
USPC ............................................ 512/12, 11, 8, 1
See application file for complete search history.

(56) References Cited

U.S. PATENT DOCUMENTS

| | | | | |
|---|---|---|---|---|
| 4,534,891 | A | 8/1985 | Boden et al. | |
| 6,287,603 | B1 | 9/2001 | Prasad et al. | |
| 8,187,580 | B2 | 5/2012 | Dykstra et al. | |
| 10,092,023 | B2 | 10/2018 | Dardelle et al. | |
| 2002/0019369 | A1 | 2/2002 | Li et al. | |
| 2010/0305021 | A1 | 12/2010 | Dykstra | |
| 2016/0222327 | A1 | 8/2016 | Herrmann et al. | |
| 2022/0340837 | A1* | 10/2022 | Herrmann | C07C 323/22 |

FOREIGN PATENT DOCUMENTS

| | | | | |
|---|---|---|---|---|
| WO | 0238120 | A1 | 5/2002 | |
| WO | 03049666 | A2 | 6/2003 | |
| WO | WO-2013000669 | A1 * | 1/2013 | A61K 8/368 |
| WO | 2015023961 | A1 | 2/2015 | |
| WO | 2019179939 | A1 | 9/2019 | |
| WO | WO-2019185468 | A1 * | 10/2019 | C07D 213/32 |
| WO | 2020109132 | A1 | 6/2020 | |
| WO | 2021122997 | A1 | 6/2021 | |

OTHER PUBLICATIONS

Gerke et al, WO 2013000669 Machine Translation, Jan. 3, 2013 (Year: 2013).*
Besse et al., "Access to nonisocyanate poly(thio)urethanes: A comparative study", Journal of Polymer Science, Part A: Polymer Chemistry, May 16, 2013, vol. 51, Issue 15, pp. 3284-3296.
Hua et al., "Isocyanate-Free, UV-Crosslinked Poly(Hydroxyurethane) Networks: A Sustainable Approach toward Highly Functional Anti-bacterial Gels", Macromolecular Bioscience, Aug. 15, 2017, vol. 17, pp. 1-9.
International Search Report from PCT Application No. PCT/US2021/035646 dated Sep. 27, 2021, 3 pages.

* cited by examiner

*Primary Examiner* — Jessica Whiteley

(57) ABSTRACT

The present invention relates to profragrance compounds and their preparation. Also disclosed are delivery systems and consumer products containing the profragrance compounds.

6 Claims, No Drawings

PROFRAGRANCE CONJUGATES

CROSS-REFERENCE TO RELATED APPLICATIONS

This application is a U.S. National Stage Application under 35 U.S.C. § 371 of International Application No. PCT/US2021/035646, filed Jun. 3, 2021, which claims priority to U.S. Provisional Application No. 63/034,148, filed Jun. 3, 2020, the disclosure of which is incorporated by reference herein in its entirety.

FIELD OF THE INVENTION

The present invention relates to profragrance compounds for controlled release of fragrance molecules in consumer products.

BACKGROUND OF THE INVENTION

Profragrances have been used in the fragrance industry to provide protection of unstable fragrance molecules and to enhance the delivery in a controlled manner.

Conjugate compounds have been used as profragrances. WO 2003/04%66 A2 describes sulfur-containing conjugate compounds for controlled release of fragrance ingredients. US 2016/0222327 A1 discloses thioether conjugates as profragrances. Upon exposure to a trigger such as light, water, heat or pH change, these conjugates break down and release a fragrance molecule and a thiol compound. See also WO 2002/038120 A1. However, due to incomplete release, profragrances often have a weak perceived fragrance intensity. Many by-product thiol compounds have a strong unpleasant odor, which requires quenching by an additive.

There is a need to develop profragrances with a high release rate but without an unpleasant odor.

SUMMARY OF THE INVENTION

The present invention provides novel profragrance compounds and their unexpected advantageous delivery of fragrance molecules with a high perceived fragrance intensity when used in consumer products such as fabric care products, personal care products, home care products, and the like.

One aspect of this invention relates to profragrance compounds that are the Michael addition products of one or two fragrance molecules and 3,6-dioxa-1,8-octane-dithiol, in which each of the one or two fragrance molecules has an α,β-unsaturated carbonyl group. When a profragrance compound is the Michael addition product of two fragrance molecules and 3,6-dioxa-1,8-octane-dithiol, these two fragrance molecules can be different or same.

Preferably, the one or two fragrance molecules are selected from the group consisting of coumarin, isojasmone, 1-(5,5-dimethyl-1-cyclohexenyl)pent-4-en-1-one, 2-(4-methylbenzylidene)heptanal, damascone, 2-methylpentan-3-yl but-2-enoate, and 4-methyldec-3-en-5-one.

Another aspect of this invention relates to a delivery system containing a profragrance compound described above. Also within the scope of this invention are consumer products containing one or more of these profragrance compounds. Still within the scope of this invention include fragrance compositions containing one or more of the profragrance compounds, and methods of improving, enhancing or modifying a fragrance formulation through the addition of an olfactory acceptable amount of one or more of the profragrance compounds.

DETAILED DESCRIPTION OF THE INVENTION

It has been surprisingly and unexpectedly found that the profragrance compounds of the present invention can efficiently deliver fragrance molecules with a high fragrance performance.

The profragrance compounds have the following general structure:

Formula A

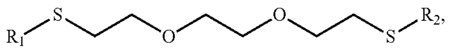

in which each of $R_1$ and $R_2$ can be H or a fragrance moiety, provided that at least one of $R_1$ and $R_2$ is the fragrance moiety. When both $R_1$ and $R_2$ are fragrance moieties, they can be same or different. Each fragrance moiety is derived from an α,β-unsaturated fragrance molecule having an α,β-unsaturated carbonyl group

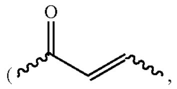

(in which a wavy bound indicates a covalent bonding). This α,β-unsaturated fragrance molecule is capable of reacting with 3,6-dioxa-1,8-octane-dithiol to form a Michael addition product of a compound of Formula A.

Exemplary compounds of Formula A include those shown in Scheme 1 below:

Scheme 1.

III

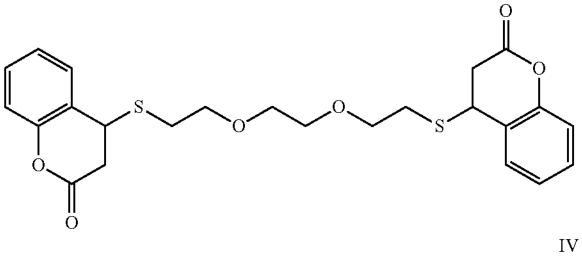

IV

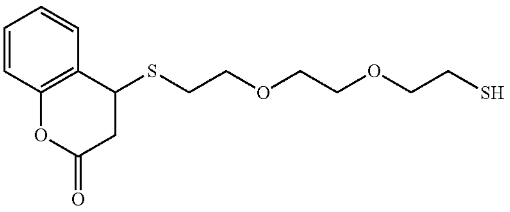

VI

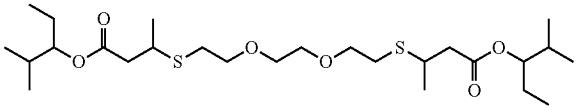

-continued

VII

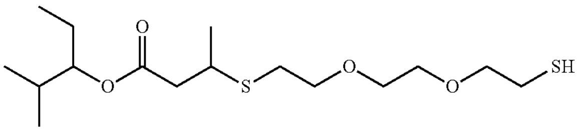

IX

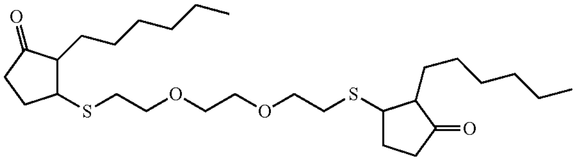

X

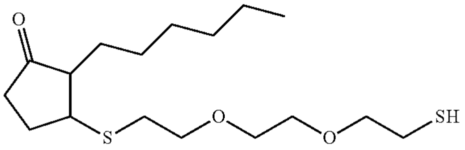

XII

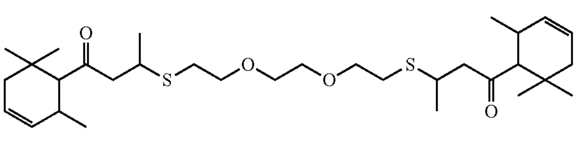

XIII

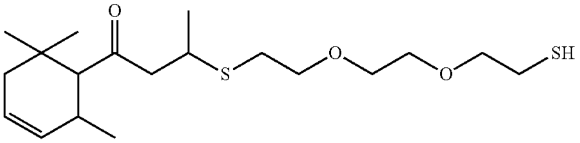

XV

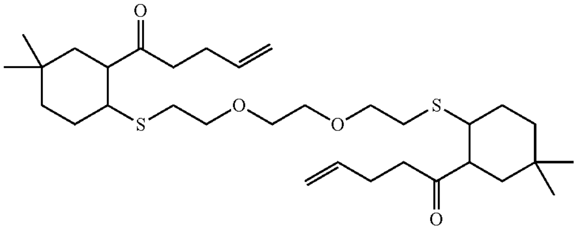

XVI

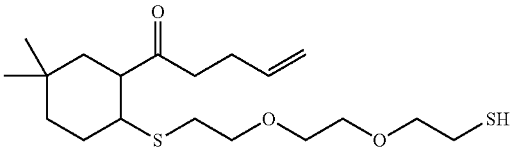

XVIII

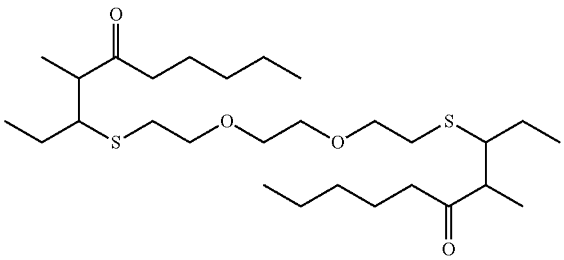

-continued

XIX

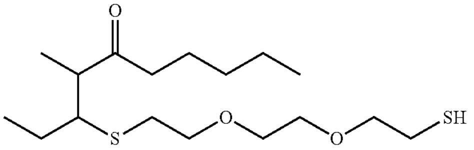

Suitable α,β-unsaturated fragrance molecules include:

Scheme 2.

II

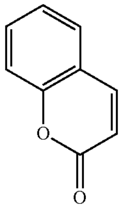

V

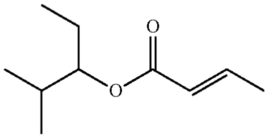

VIII

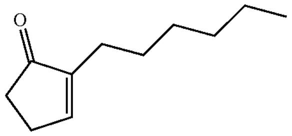

XI

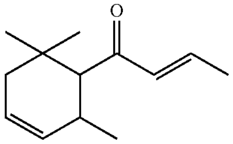

XIV

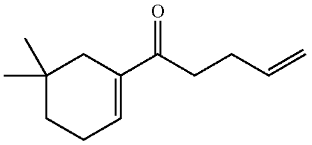

XVII

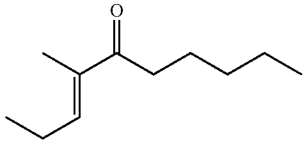

Other suitable α,β-unsaturated fragrance molecules include (E)-2-(4-methylbenzylidene)heptanal (Acalea™), allyl cinnamate, ethyl cinnamate, (Z)-3-phenylacrylonitrile (Cinnamalva™), 3-phenylacrylaldehyde (cinnamic aldehyde), ethyl (E)-2-methylbut-2-enoate (ethyl tiglate), 2-benzylideneoctanal (hexyl cinnamic aldehyde), 3-methyl-2-pentylcyclopent-2-en-1-one (dihydrojasmone), (Z)-3-methyl-2-(pent-2-en-1-yl)cyclopent-2-en-1-one (jasmone cis), 2-methyl-4-oxo-4H-pyran-3-yl isobutyrate (maltol isobutyrate), (E)-2-methyl-3-phenylacrylaldehyde (methyl cinnamaldehyde), and 1-(3,6,8,8-tetramethyl-2,3,4,7,8,8a-hexahydro-1H-3a,7-methanoazulen-5-yl)ethan-1-one (Vertofix®). Preferred α,β-unsaturated fragrance molecules are (E)-2-(4-methylbenzylidene)heptanal (Acalea™), allyl cinnamate, ethyl cinnamate, 3-phenyl-acrylaldehyde (cinnamic aldehyde), ethyl tiglate, 3-methyl-2-pentylcyclopent-2-en-1-one (dihydrojasmone), and (Z)-3-methyl-2-(pent-2-en-1-yl) cyclopent-2-en-1-one (jasmone cis).

The profragrance compounds of this invention can be used as standalone free ingredients in any fragrance compositions and consumer products. They can also be incorporated into a delivery system including a microcapsule delivery system (WO 2015/023961A1), a polymer-assisted delivery system (polymeric particles, see U.S. Pat. No. 8,187,580), a fiber-assisted delivery system (US 2010/0305021), a cyclodextrin complex (U.S. Pat. No. 6,287,603 and US 2002/0019369), a coacervate complex (WO 2019/179939A1 and U.S. Pat. No. 10,092,023B2), and any combinations thereof. Preferably, the delivery system is sustainable or biodegradable.

"Biodegradable" as used herein with respect to a material, such as a microcapsule as a whole and/or a biopolymer of the microcapsule shell, has no real or perceived health and/or environmental issues, and is capable of undergoing and/or does undergo physical, chemical, thermal, microbial and/or biological degradation. Ideally, a microcapsule and/or biopolymer is deemed "biodegradable" when the microcapsule and/or biopolymer passes one or more of the Organization for Economic Cooperation and Development (OECD) tests including, but not limited to OECD 301/310 (Ready biodegradation). OECD 302 (inherent biodegradation), ISO 17556 (solid stimulation studies), ISO 14851 (fresh water stimulation studies), ISO 18830 (marine sediment stimulation studies), OECD 307 (soil stimulation studies), OECD 308 (sediment stimulation studies), and OECD 309 (water stimulation studies). In particular embodiments, the microcapsules are readily biodegradable as determined using the OECD 310 test. The pass level for ready biodegradability under OECD 310 is 60% of ThC02 production is reached in a 10-day window within the 28-day period of the test, wherein the 10-day window begins when the degree of biodegradation has reached 10%.

Suitable microcapsule delivery systems each contain a plurality of microcapsules dispersed in an aqueous phase, in which each of the microcapsules has a core-shell structure with a single microcapsule core and a microcapsule shell encapsulating the microcapsule core. The microcapsule core has an active material such as a profragrance, fragrance, flavor, malodor counteracting active, a cosmetic active, a nutrient, and the like. The microcapsule wall is formed of an encapsulating polymer which can be selected from the group consisting of a sol-gel polymer (e.g., silica), polyacrylate, polyacrylamide, poly(acrylate-co-acrylamide), polyurea, polyurethane, starch, gelatin and gum Arabic, coacervate complex, poly(melamine-formaldehyde), poly(urea-formaldehyde), protein, polysaccharide, polyphenol, and combinations thereof.

The use of the compounds of the present invention is widely applicable in perfumery products, including the preparation of perfumes and colognes, the perfuming of personal care products such as soaps, shower gels, and hair care products, fabric care products, air fresheners, and cosmetic preparations. The present invention can also be used to perfume cleaning agents, such as detergents, dishwashing materials, scrubbing compositions, window cleaners and the like.

In these preparations, the profragrance compounds of the present invention can be used alone or in combination with other perfuming compositions, solvents, adjuvants and the like. The nature and variety of the other ingredients that can also be employed are known to those skilled in the art. Many types of fragrance ingredients can be employed in the present invention, the only limitation being the compatibility with the other components being employed. Suitable fragrance ingredients include but are not limited to fruits such as almond, apple, cherry, grape, pear, pineapple, orange, strawberry, raspberry; musk, flower scents such as lavender-like, rose-like, iris-like, carnation-like. Other pleasant scents include herbal and woodland scents derived from pine, spruce and other forest smells. Fragrance ingredients may also be derived from various oils, such as essential oils, or from plant materials such as peppermint, spearmint and the like.

A list of suitable fragrance ingredients is provided in U.S. Pat. No. 4,534,891, the contents of which are incorporated by reference as if set forth in its entirety. Another source of suitable fragrance ingredients is found in *Perfumes, Cosmetics and Soaps*, Second Edition, edited by W. A. Poucher, 1959. Among the fragrance ingredients provided in this treatise are acacia, cassie, chypre, cyclamen, fem, gardenia, hawthorn, heliotrope, honeysuckle, hyacinth, jasmine, lilac, lily, magnolia, mimosa, narcissus, freshly-cut hay, orange blossom, orchid, reseda, sweet pea, trefle, tuberose, vanilla, violet, wallflower, and the like.

The profragrance compounds of the present invention can be used in combination with a complementary fragrance compound. The term "complementary fragrance compound" as used herein is defined as a fragrance compound selected from the group consisting of 2-(4-methylphenyl)methylene-heptanal (Acalea), iso-amyl oxyacetic acid allylester (Allyl Amyl Glycolate), (3,3-dimethylcyclohexyl)ethyl propane-1,3-dioate (Applelide), (E/Z)-1-ethoxy-1-decene (Arctical), 2-ethyl-4-(2,2,3-trimethyl-3-cyclo-penten-1-yl)-2-buten-1-ol (Bacdanol), 2-methyl-3-[(1,7,7-trimethylbicyclo[2.2.1]hept-2-yl)oxy] exo-1-propanol (Bomafix), 1,2,3,5,6,7-hexahydro-1,1,2,3,3-pentamethyl-4H-inden-4-one (Cashmeran), trimethylcyclopentenylmethyloxabicyclooctane (Cassiffix), 1,1-dimethoxy-3,7-dimethyl-2,6-octadiene (Citral DMA), 3,7-dimethyl-6-octen-1-ol (Citronellol), 3A,4,5,6,7,7A-hexahydro-4,7-methano-1H-inden-5/6-yl acetate (Cyclacet), 3A,4,5,6,7,7A-hexahydro-4,7-methano-1H-inden-5/6-yl propinoate (Cyclaprop), 3A,4,5,6,7,7A-hexahydro-4,7-methano-1G-inden-5/6-yl butyrate (Cyclobutanate), 1-(2,6,6-trimethyl-3-cyclohexen-1-yl)-2-buten-1-one (Delta Damascone), 3-(4-ethylphenvl)-2,2-dimethyl propanenitrile (Fleuranil), 3-(O/P-ethylphenyl) 2,2-dimethyl propionaldehyde (Floralozone), tetrahydro-4-methyl-2-(2-methylpropyl)-2H-pyran-4-ol (Floriffol), 1,3,4,6,7,8-hexahydro-4,6,6,7,8,8-hexamethylcyclopenta-gamma-2-benzopyran (Galaxolide), 1-(5,5-dimethyl-1-cyclohexen-1-yl)pent-4-en-1-one (Galbascone), E/Z-3,7-dimethyl-2,6-octadien-1-yl acetate (Geranyl Acetate), α-methyl-1,3-benzodioxole-5-propanal (Helional), 1-(2,6,6-trimethyl-2-cyclohexen-1-yl)-1,6-heptadien-3-one (Hexalon), (Z)-3-hexenyl-2-hydroxybenzoate (Hexenyl Salicylate, CIS-3), 4-(2,6,6-trimethyl-2-cyclohexen-1-yl)-3-buten-2-one (Ionone α), 1-(1,2,3,4,5,6,7,8-octahydro-2,3,8,8-tetramethyl-2-naphthalenyl)-ethan-1-one (Iso E Super), methyl 3-oxo-2-pentylcyclopentaneacetate (Kharismal), 2,2,4-trimethyl-4-phenyl-butanenitrile (Khusinil), 3,4,5,6,6-pentamethylhept-3-en-2-one (Koavone), 3/4-(4-hydroxy-4-methyl-pentyl) cyclohexene-1-carboxaldehyde (Lyral), 3-methyl-4-(2,6,6-trimethyl-2-cyclohexen-1-yl)-3-buten-2-one (Methyl Ionone γ), 1-(2,6,6-trimethyl-2-cyclohexen-1-yl) pent-1-en-3-one (Methyl Ionone α Extra, Methyl Ionone N), 3-methyl-4-phenylbutan-2-ol (Muguesia), cyclopentadec-4-en-1-one (Musk Z4), 3,3,4,5,5-pentamethyl-11,13-dioxatricyclo

[7.4.0.0<2,6>]tridec-2(6)-ene (Nebulone), 3,7-dimethyl-2,6-octadien-1-yl acetate (Neryl Acetate), 3,7-dimethyl-1,3,6-octatriene (Ocimene), ortho-tolylethanol (Peomosa), 3-methyl-5-phenylpentanol (Phenoxanol), 1-methyl-4-(4-methyl-3-pentenyl) cyclohex-3-ene-1-carboxaldehyde (Precyclemone B), 4-methyl-8-methylene-2-adamantanol (Prismantol), 2-ethyl-4-(2,2,3-trimethyl-3-cyclopenten-1-yl)-2-buten-1-ol (Sanjinol), 2-methyl-4-(2,2,3-trimethyl-3-cyclopenten-1-yl)-2-buten-1-ol (Santaliff), Terpineol, 2,4-dimethyl-3-cyclohexene-1-carboxaldehyde (Triplal), decahydro-2,6,6,7,8,8-hexamethyl-2H-indeno[4,5-B]furan (Trisamber), 2-tert-butylcyclohexyl acetate (Verdox), 4-tert-butylcyclohexyL acetate (Vertenex), acetyl cedrene (Vertofix), 3,6/4,6-dimethylcyclohex-3-ene-1-carboxaldehyde (Vertoliff), and (3Z)-1-[(2-methyl-2-propenyl)oxy]-3-hexene (Vivaldie).

The terms "fragrance formulation". "fragrance composition", and "perfume composition" mean the same and refer to a consumer composition that is a mixture of fragrance ingredients including, for example, alcohols, aldehydes, ketones, esters, ethers, lactones, nitriles, natural oils, synthetic oils, and mercaptans, which are admixed so that the combined odors of the individual components produce a pleasant or desired fragrance. The fragrance formulation of the present invention is a consumer composition comprising a compound of the present invention. The fragrance formulation of the present invention comprises a compound of the present invention and further a complementary fragrance compound as defined above.

The term "fragrance molecule" refers to a final fragrance ingredient released from the profragrance compound.

The term "fragrance product" means a consumer product containing a fragrance ingredient that adds fragrance or masks malodor. Fragrance products may include, for example, perfumes, colognes, bar soaps, liquid soaps, shower gels, foam baths, cosmetics, skin care products such as creams, lotions and shaving products, hair care products for shampooing, rinsing, conditioning, bleaching, coloring, dyeing and styling, deodorants and antiperspirants, feminine care products such as tampons and feminine napkins, baby care products such as diapers, bibs and wipes, family care products such as bath tissues, facial tissues, paper handkerchiefs or paper towels, fabric products such as fabric softeners and fresheners, air care products such as air fresheners and fragrance delivery systems, cosmetic preparations, cleaning agents and disinfectants such as detergents, dishwashing materials, scrubbing compositions, glass and metal cleaners such as window cleaners, countertop cleaners, floor and carpet cleaners, toilet cleaners and bleach additives, washing agents such as all-purpose, heavy duty, and hand washing or fine fabric washing agents including laundry detergents and rinse additives, dental and oral hygiene products such as toothpastes, tooth gels, dental flosses, denture cleansers, denture adhesives, dentifrices, tooth whitening and mouthwashes, health care and nutritional products and food products such as snack and beverage products. The fragrance product of the present invention is a consumer product that contains a compound of the present invention. The fragrance product of the present invention contains a compound of the present invention and further a complementary fragrance compound as defined above.

The term "improving" in the phrase "improving, enhancing or modifying a fragrance formulation" is understood to mean raising the fragrance formulation to a more desirable character. The term "enhancing" is understood to mean making the fragrance formulation greater in effectiveness or providing the fragrance formulation with an improved character. The term "modifying" is understood to mean providing the fragrance formulation with a change in character.

The term "olfactory acceptable amount" is understood to mean the amount of a compound in a fragrance formulation, wherein the compound will contribute its individual olfactory characteristics. However, the olfactory effect of the fragrance formulation will be the sum of effect of each of the fragrance ingredients. Thus, the compound of the present invention can be used to improve or enhance the aroma characteristics of the fragrance formulation, or by modifying the olfactory reaction contributed by other ingredients in the formulation. The olfactory acceptable amount may vary depending on many factors including other ingredients, their relative amounts and the olfactory effect that is desired.

The amount of the compounds of the present invention employed in a fragrance formulation varies from 0.0001 to 70 weight percent, preferably from 0.005 to 50 weight percent, more preferably from 0.5 to 25 weight percent, and even more preferably from 1 to 10 weight percent. Those with skill in the art will be able to employ the desired amount to provide desired fragrance effect and intensity. In addition to the compounds of the present invention, other materials can also be used in conjunction with the fragrance formulation to encapsulate and/or deliver the fragrance. Some well-known materials are, for example, but not limited to, polymers, oligomers and other adjuvants such as surfactants, emulsifiers, lipids including fats, waxes and phospholipids, organic oils, mineral oils, petrolatum, natural oils, perfume fixatives, fibers, starches, sugars and solid surface materials such as zeolite and silica.

When used in a fragrance formulation these ingredients provide protection of vulnerable fragrance molecules and release them upon a trigger event with additional notes to make a fragrance formulation more desirable and noticeable, and add the perception of value. The odor qualities found in these fragrance molecules assist in beautifying and enhancing the finished accord as well as improving the performance of the other materials in the fragrance composition.

In addition, the compounds of the present invention are also useful to protect fragrance molecules in malodor counteracting applications such as body perspiration, environmental odor such as mold and mildew, bathroom, etc. These fragrance molecules substantially eliminate the perception of malodors and/or prevent the formation of such malodors, thus, can be utilized with a vast number of consume products.

Examples of the consumer products are provided herein to illustrate the various aspects of the present invention. However, they do not intend to limit the scope of the present invention. The consumer products may include, for example, a conventional room freshener (or deodorant) composition such as room freshener sprays, an aerosol or other spray, fragrance diffusers, a wick or other liquid system, or a solid, for instance candles or a wax base as in pomanders and plastics, powders as in sachets or dry sprays or gels, as in solid gel sticks, clothes deodorants as applied by washing machine applications such as in detergents, powders, liquids, whiteners or fabric softeners, fabric refreshers, linen sprays, closet blocks, closet aerosol sprays, or clothes storage areas or in dry cleaning to overcome residual solvent notes on clothes, bathroom accessories such as paper towels, bathroom tissues, sanitary napkins, towelettes, disposable wash cloths, disposable diapers, and diaper pail deodorants, cleansers such as disinfectants and toilet bowl cleaners, cosmetic products such as antiperspirant and deodorants, general body deodorants in the form of powders, aerosols, liquids or solid, or hair care products such as hair sprays, conditioners, rinses, hair colors and dyes, permanent waves, depilatories, hair straighteners, hair groom applications such as pomade, creams and lotions, medicated hair care products containing such ingredients as selenium sulphide, coal tar or salicylates, or shampoos, or foot care products such as foot powders, liquids or colognes, after shaves and body lotions, or soaps and synthetic detergents such as bars, liquids, foams or powders, odor control such as during manufacturing processes, such as in the textile finishing industry and the printing industry (inks and paper), effluent control such as in processes involved in pulping, stock yard and meat processings, sewage treatment, garbage bags, or garbage disposal, or in product odor control as in textile finished goods, rubber finished goods or car fresheners, agricultural and pet care products such as dog and hen house effluents and domestic animal and pet care products such as deodorants, shampoo or cleaning agents, or animal litter material and in large scale closed air systems such as auditoria, and subways and transport systems.

Thus, it will be seen that the composition of the invention is usually one in which the malodor counteractant is present together with a carrier by means of which or from which the malodor counteractant can be introduced into air space wherein the malodor is present, or a substrate on which the malodor has deposited. For example, the carrier can be an aerosol propellant such as a chlorofluoro-methane, or a solid such as a wax, plastics material, rubber, inert powder or gel. In a wick-type air freshener, the carrier is a substantially odorless liquid of low volatility. In several applications, a composition of the invention contains a surface active agent or a disinfectant, while in others, the malodor counteractant is present on a fibrous substrate. In many compositions of the invention there is also present a fragrance component which imparts a fragrance to the composition. The fragrances stated above can all be employed.

Malodor counteracting effective amount is understood to mean the amount of the inventive malodor counteractant employed in a functional product that is organoleptically effective to abate a given malodor while reducing the combined intensity of the odor level, wherein the given malodor is present in air space or has deposited on a substrate. The exact amount of malodor counteractant agent employed may vary depending upon the type of malodor counteractant, the type of the carrier employed, and the level of malodor counteractancy desired. In general, the amount of malodor counteractant agent present is the ordinary dosage required to obtain the desired result. Such dosage is known to the skilled practitioner in the art. In a preferred embodiment, when used in conjunction with malodorous solid or liquid functional products, e.g., soap and detergent, the compounds of the present invention may be present in an amount ranging from 0.005 to 50 weight percent, preferably from 0.01 to 20 weight percent, and more preferably from 0.05 to 5 weight percent, and when used in conjunction with malodorous gaseous functional products, the compounds of the present invention may be present in an amount ranging from 0.1 to 10 mg per cubic meter of air.

The following are provided as specific embodiments of the present invention. Other modifications of this invention will be readily apparent to those skilled in the art. Such modifications are understood to be within the scope of this invention. As used herein all percentages are weight percent unless otherwise noted, ppm is understood to stand for parts per million, L is understood to be liter, mL is understood to be milliliter, g is understood to be gram, Kg is understood to be kilogram, mol is understood to be mole, psi is understood to be pound-force per square inch, and mmHg be millimeters (mm) of mercury (Hg). IFF as used in the examples is understood to mean International Flavors & Fragrances Inc., New York, NY, USA.

The invention is described in greater detail by the following non-limiting examples. Without further elaboration, it is believed that one skilled in the art can, based on the description herein, utilize the present invention to its fullest extent. All publications cited herein are incorporated by reference in their entirety.

Example 1

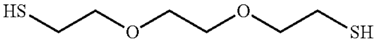

I

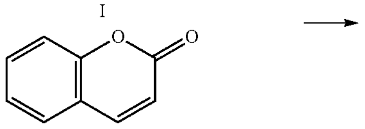

II

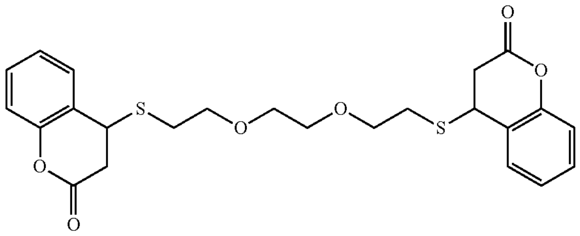

III

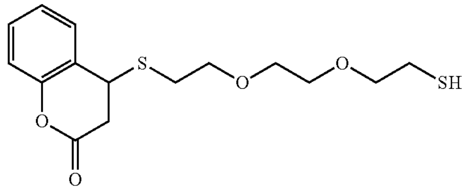

IV

To a solution of 2H-chromen-2-one (II, 6 g, 41.1 mmol) and 1,8-Diazabicyclo[5.4.0]undec-7-ene ("DBU", 0.625 g, 4.11 mmol) in tetrahydrofuran ("THF", 10 g) was added 2,2'-(ethane-1,2-diylbis(oxy))bis(ethane-1-thiol) (I, 3.74 g, 20.5 mmol). The reaction mixture was stirred at room temperature for 5 hours. The solvent was removed under reduced pressure to afford a clear, slightly yellow oil, which was purified by flash chromatography to give 0.83 g of 4-((2-(2-(2-mercapto-ethoxy)ethoxy)ethyl)thio)chroman-2-one (IV, 12%) and 0.4 g of 4,4'-(((ethane-1,2-diylbis(oxy)) bis(ethane-2,1-diyl))bis(sulfanediyl))bis(chroman-2-one) (III, 4%).

$^1$H NMR of Compound III (400 MHz, CHLOROFORM-d) δ: 7.31 (m, 4H), 7.11 (m, 4H), 4.40 (t, J=4.14 Hz, 2H), 3.64 (m, 8H), 3.07 (m, 4H), 2.71 (m, 4H).

$^1$H NMR of Compound IV (400 MHz, CHLOROFORM-d) δ: 7.33 (m, 2H), 7.13 (m, 2H), 4.45 (t, J=4.15 Hz, 1H), 3.65 (m, 8H), 3.10 (m, 2H), 2.71 (m, 4H), 1.58 (t, J=8.19 Hz, 1H).

Example 2

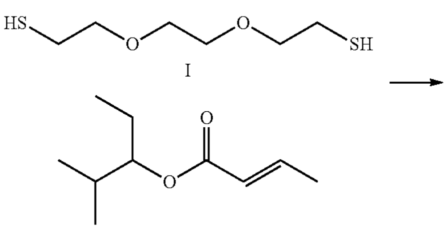

I

V

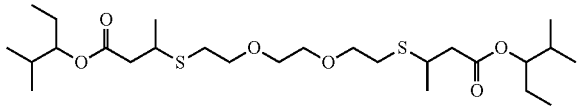

VI

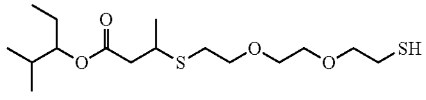

VII

To a solution of 2-methylpentan-3-yl (E)-but-2-enoate (V, 6 g, 35.2 mmol) and DBU (0.537 g, 3.52 mmol) in THF (10 g) was added 2,2'-(ethane-1,2-diylbis(oxy))bis-(ethane-1-thiol) (I, 3.21 g, 17.6 mmol). The reaction mixture was stirred at room temperature for 6 hours. The solvent was removed under reduced pressure. The crude product was purified by flash chromatography to give 3.5 g of bis(2-methyl-pentan-3-yl) 3,14-dimethyl-7,10-dioxa-4,13-dithia-hexadecanedioate (VI, 38%) and 1.1 g of 2-methylpentan-3-yl 3-((2-(2-(2-mercaptoethoxy)ethoxy)ethyl)thio) butanoate (VII, 18%).

$^1$H NMR of Compound VI (500 MHz, CHLOROFORM-d) δ: 4.67 (m, 2H), 3.60 (m, 8H), 3.23 (m, 2H), 2.73 (m, 4H), 2.63 (m, 2H), 2.43 (m, 2H), 1.81 (m, 2H), 1.53 (m, 4H), 1.31 (d, J=6.60 Hz, 6H), 0.86 (m, 18H).

$^1$H NMR of Compound VII (500 MHz, CHLOROFORM-d) δ: 4.69 (m, 1H), 3.63 (m, 8H), 3.26 (m, 1H), 2.61-2.80 (m, 5H), 2.44 (m, 1H), 1.82 (m, 1H), 1.57 (t, J=8.23 Hz, 1H), 1.53 (m, 2H), 1.33 (d, J=6.88 Hz, 3H), 0.88 (m, 9H).

Example 3

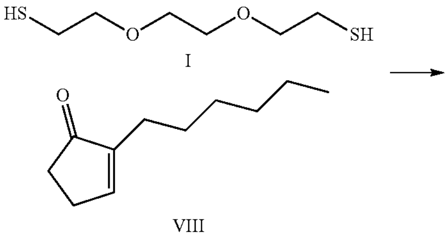

I

VIII

-continued

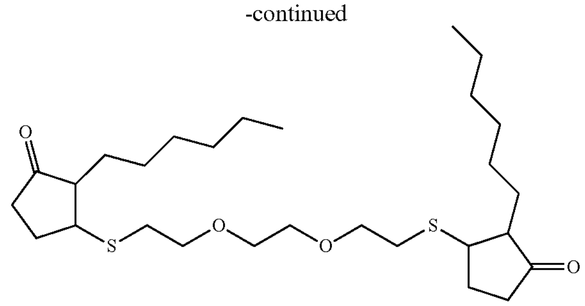

IX

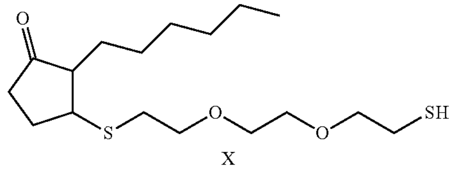

X

To a solution of 2-hexylcyclopent-2-en-1-one (VII, 6 g, 36.1 mmol) and DBU (0.549 g, 3.61 mmol) in THF (10 g) was added 2,2'-(ethane-1,2-diylbis(oxy))bis(ethane-1-thiol) (1, 3.29 g, 18.04 mmol). The reaction mixture was stirred at room temperature for 6 hours. The solvent was removed under reduced pressure to afford a slightly cloudy oil, which was purified by flash chromatography to give 1.4 g of 3,3'-(((ethane-1,2-diylbis(oxy))bis(ethane-2,1-diyl))bis(sulfane-diyl))bis(2-hexylcyclopentan-1-one) (IX, 15%) and 0.7 g of 2-hexyl-3-((2-(2-(2-mercaptoethoxy)-ethoxy)ethyl) thio)cyclo-pentan-1-one (X, 11%).

$^1$H NMR of Compound IX (500 MHz, CHLOROFORM-d) δ: 3.65 (m, 8H), 3.09 (m, 2H), 2.75 (m, 4H), 2.41 (m, 4H), 2.11 (m, 2H), 1.98 (m, 2H), 1.83 (m, 2H), 1.58 (m, 4H), 1.19-1.46 (m, 16H), 0.86 (m, 6H).

$^1$H NMR of Compound X (500 MHz, CHLOROFORM-d) δ: 3.62 (m, 8H), 3.12 (m, 1H), 2.78 (m, 2H), 2.67 (m, 2H), 2.41 (m, 2H), 2.14 (m, 1H), 1.98 (m, 1H), 1.85 (m, 1H), 1.57 (m, 3H), 1.19-1.45 (m, 8H), 0.86 (M, 3H).

Example 4

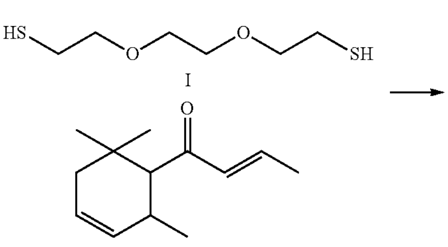

I

XI

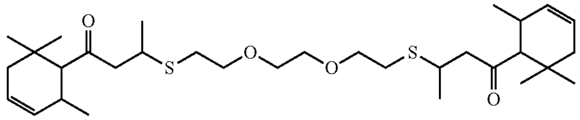

XII

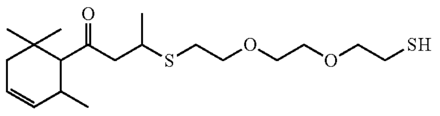

XIII

To a solution of 1-(2,6,6-trimethylcyclohex-3-en-1-yl) but-2-en-1-one (XI, 6 g, 31.2 mmol) and DBU (0.475 g, 3.12 mmol) in THF (10 g) was added Compound I (2.84 g, 15.6 mmol). The reaction mixture was stirred at room temperature for 6 hours. The solvent was removed under reduced pressure to afford a clear, bright yellow oil, which was purified by flash chromatography to give 2.6 g of 3,14-dimethyl-1,16-bis(2,6,6-trimethylcyclohex-3-en-1-yl)-7,10-dioxa-4,13-dithiabexadecane-1,16-dione (XII, 29%) and 0.9 g of 3-((2-(2-(2-mercaptoethoxy)ethoxy)ethyl)thio)-1-(2,6,6-trimethylcyclohex-3-en-1-yl)butan-1-one (XIII, 15%).

$^1$H NMR of Compound XII (500 MHz, CHLOROFORM-d) δ: 5.52 (m, 2H), 5.45 (m, 2H), 3.62 (m, 8H), 3.33 (, 2H), 2.69 (m, 8H), 2.51 (m, 2), 2.19 (m, 2H), 1.96 (m, 2H), 1.68 (m, 2H), 1.29 (d, J=6.92 Hz, 6H), 0.92 (m, 18H).

$^1$H NMR of Compound XIII (500 MHz, CHLOROFORM-d) δ: 5.52 (m, 1H), 5.43 (m, 1H), 3.62 (m, 8H), 3.33 (m, 1H), 2.47-2.92 (m, 2H), 2.72 (m, 4H), 2.51 (m, 1H), 2.20 (m, 1H), 1.95 (m, 1H), 1.68 (m, 1H), 1.57 (t, J=8.23 Hz, 1H), 1.29 (m, 3H), 0.95 (m, 6H), 0.87 (M, 3H).

Example 5

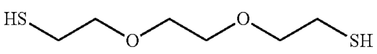

I

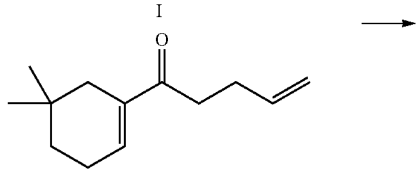

XIV

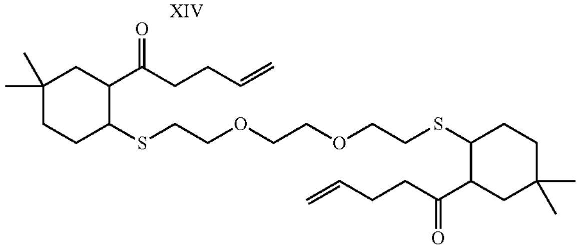

XV

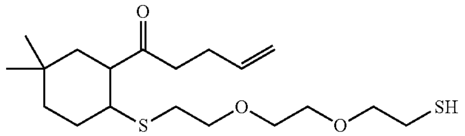

XVI

To a solution of 1-(5,5-dimethylcyclohex-1-en-1-yl)pent-4-en-1-one (XIV, 6 g, 31.2 mmol) and DBU (0.475 g, 3.12 mmol) in THF (10 g) was added 2,2'-(ethane-1,2-diylbis(oxy))bis(ethane-1-thiol) (1, 2.84 g, 15.6 mmol). The reaction mixture was stirred at room temperature for 6 hours. The solvent was removed under reduced pressure to give a slightly yellow oil, which was purified by flash chromatography to yield 3.9 g of 1,1'-((((ethane-1,2-diylbis(oxy))bis(ethane-2,1-diyl))bis(sulfanediyl))bis-(5,5-dimethyl-cyclohexane-2,1-diyl))bis(pent-4-en-1-one) (XV, 44%) and 0.6 g of 1-(2-((2-(2-(2-mercaptoethoxy)ethoxy)ethyl)thio)-5,5-dimethylcyclohexyl)-pent-4-en-1-one (XVI, 11%).

$^1$H NMR of Compound XV (500 MHz, CHLOROFORM-d) δ: 5.80 (m, 2H), 5.00 (m, 4H), 3.54 (m, 8H), 2.63 (m, 12H), 2.31 (m, 4H), 1.95 (m, 2H), 1.54 (m, 2H), 1.40 (m, 4H), 1.21 (m, 4H), 0.9 (m, 12H).

$^1$H NMR of Compound XVI (400 MHz, CHLOROFORM-d) δ: 5.76-5.91 (m, 1H), 4.94-5.12 (m, 2H), 3.53-3.69 (m, 8H), 2.46-2.82 (m, 8H), 2.28-2.42 (m, 2H), 1.93-2.07 (m, 1H), 1.53-1.66 (m, 2H), 1.38-1.51 (m, 2H), 1.16-1.34 (m, 2H), 0.95 (s, 3H), 0.94 (s, 3H).

Example 6

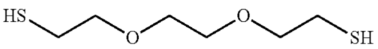

I

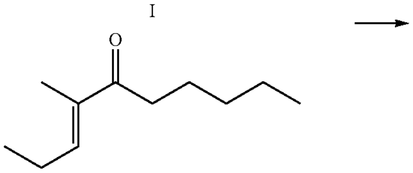

XVII

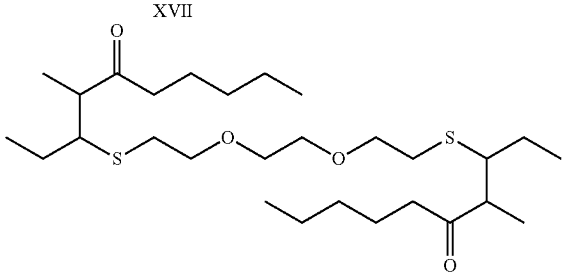

XVIII

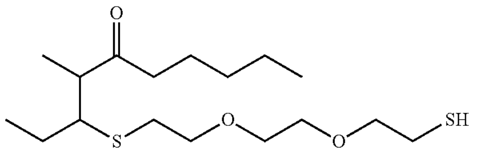

XIX

To a solution of (E)-4-methyldec-3-en-5-one (XVII, 5 g, 29.7 mmol) and DBU (0.18 g, 1.19 mmol) in tetrahydrofuran ("THF", 5 g) was added 2,2'-(ethane-1,2-diylbis(oxy))bis(ethane-1-thiol) (I, 2.17 g, 11.9 mmol). The reaction mixture was stirred at room temperature for 24 hours. The solvent was removed under reduced pressure to afford a yellow oil, which was purified by flash chromatography to give 6.17 g of 8,19-diethyl-7,20-dimethyl-12,15-dioxa-9,18-dithiahexacosane-6,21-dione (XVIII, 73%) and 0.5 g of 3-((2-(2-(2-mercaptoethoxy)ethoxy)ethyl)thio)-4-methyldecan-5-one (XIX, 11%).

1H NMR of Compound XVIII (400 MHz, CHLOROFORM-d) δ: 3.51-3.71 (m, 8H), 2.79-2.90 (m, 2H), 2.60-2.78 (m, 6H), 2.38-2.58 (m, 4H), 1.39-1.74 (m, 8H), 1.22-1.38 (m, 8H), 1.19 (d, J=7.0 Hz, 80% of 6H), 1.07 (d, J=6.9 Hz, 20% of 6H), 0.98-1.04 (m, 6H), 0.89 (t, J=7.1 Hz, 6H).

Comparative Compounds IV', IV", IX', and X'

Comparative Compound IV' was prepared following the same procedure as described in Example 1 except that 1,8-octanedithiol was used instead of 2,2'-(ethane-1,2-diyl-bis(oxy))bis(ethane-1-thiol). Comparative Compound IV" was prepared using 1-dodecanethiol ($C_{12}SH$). Similarly. Comparative Compounds IX' was prepared following the procedure in Example 3 using 1,8-octanedithiol. Comparative Compound X' was also prepared using 1-dodecanethiol.

The chemical structures of these comparative compounds are shown below.

IV'

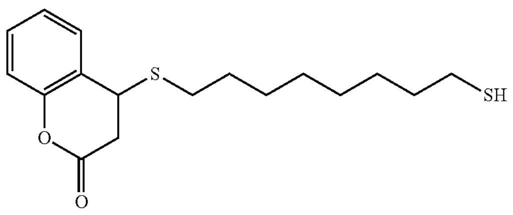

IV''

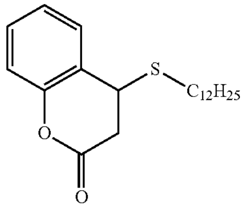

IX'

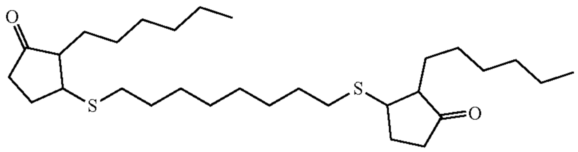

X'

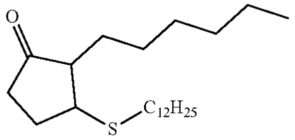

Fabric Conditioner Headspace Release Studies

Compound IV and Comparative Compounds IV' and IV'' were evaluated in a fabric conditioner headspace study. Compound II was used as a control.

Sample Preparation: Each compound was added at 1 wt % in a fabric conditioner base and allowed to macerate for 24 hours.

Wash Process: Three 4×5 inches cotton swatches were treated with the fabric conditioner diluted with 1000-folds water. After the treatment, excess water was spun out. The swatches were tumble dried for 30 minutes on high heat.

Headspace Collection: Dried swatches were placed at the bottom of a gallon size jar, covered and equilibrated for 3 hours at 40° C. After equilibration, 1 liter of headspace is collected from each jar while in a water bath at 40° C. Collection was repeated three times at initial time point (T=0), T=7 days and T=14 days after the wash process.

Headspace Analysis: Headspace samples were run on an Agilent 7890 gas chromatograph with Quadrapole Mass Spectrometer. The peak area was converted into vapor concentration based on a standard response factor and volume collected.

Unexpectedly, Compound IV was released at the highest level in the GC headspace, as much as 215.2 ng/L. By contrast, Compound II was released at 29.2 ng/L, Comparative Compound IV' was released at 65.8 ng/L, and Comparative Compound IV'' was released at 53.1 ng/L. See Table 1 below for the results.

Compounds IX and X were also evaluated together with Comparative Compounds IX' and X'. Compound VIII was used as a control.

Unexpectedly. Compound IX was released in the GC headspace at a level of 354.4 ng/L and Compound X was released at a level of 478 ng/L, much higher than the comparative compounds and the control. See Table 1 below.

TABLE 1

| Compound | GC Headspace Release, ng/L |
| --- | --- |
| IV | 215.2 |
| Comparative IV' | 65.8 |
| Comparative IV'' | 53.1 |
| Control II | 29.2 |
| IX | 354.4 |
| Comparative IX' | 86.9 |
| X | 478 |
| Comparative X' | 167.5 |
| Control VIII | 19.2 |

What is claimed is:

1. A profragrance compound, wherein the profragrance compound is selected from the group consisting of:

IX

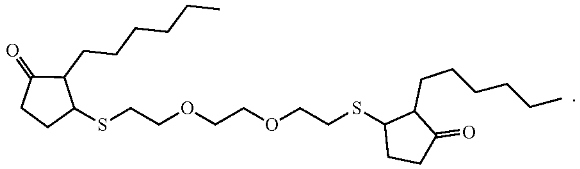

2. A delivery system containing a profragrance compound, wherein the profragrance compound is

IX

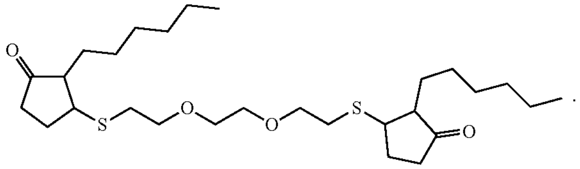

3. The delivery system of claim 2, wherein the delivery system is a microcapsule delivery system, a polymeric particle delivery system, a fiber-assisted delivery system, a cyclodextrin complex, a coacervate complex, or any combination thereof.

4. The delivery system of claim 2, wherein the delivery system is biodegradable.

5. A consumer product containing a profragrance compound, wherein the profragrance compound is

IX

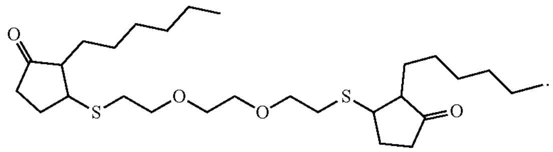

6. The consumer product of claim 5, wherein the consumer product is a fabric conditioner.

* * * * *